United States Patent [19]

Kagaya et al.

[11] Patent Number: 5,098,950
[45] Date of Patent: Mar. 24, 1992

[54] RESIN COMPOSITION AND METHOD OF MANUFACTURING THE SAME

[76] Inventors: Katsuo Kagaya, 1-17-7-1020, Takasu, Chiba-shi, Chiba-ken; Tadao Saito, 4-4, Tatsumidaihigashi, Ichihara-shi, Chiba-ken; Shichinosuke Ito, 11-11, Aobadai, Izumi-shi, Osaka, all of Japan

[21] Appl. No.: 480,467

[22] Filed: Feb. 15, 1990

[30] Foreign Application Priority Data

Feb. 15, 1989 [JP] Japan ................................ 1-35440

[51] Int. Cl.$^5$ .................. C08L 63/10; C08L 67/06; C08L 67/07; C08L 75/16
[52] U.S. Cl. ................................... 525/28; 525/31; 525/44; 525/112; 525/126; 525/166; 525/168; 525/169; 525/170
[58] Field of Search ............... 525/28, 31, 44, 166, 525/168, 169, 170, 126, 112

[56] References Cited

U.S. PATENT DOCUMENTS 3,793,398 2/1974 Hokamura ........................... 525/31

FOREIGN PATENT DOCUMENTS 189987 8/1986 European Pat. Off. .............. 525/28

Primary Examiner—Patricia Short
Attorney, Agent, or Firm—Armstrong, Nikaido, Marmelstein, Kubovcik & Murray

[57] ABSTRACT

Disclosed is a thermosetting resin composition which includes
(a) an unsaturated polyester,
(b) a polymer having a (meth)acrylate group only at one or both terminals of its main chain,
(c) a poly(meth)acrylate oligomer,
(d) a styrene monomer, and
(e) a methyl methacrylate monomer.

Also, a method of molding the resin is disclosed, which includes dividing the thermosetting resin composition into two parts, adding a curing agent to one of the two parts and a curing accelerator to another to form two partial compositions, introducing the two partial compositions into a mold, and allowing the two partial compositions to mix with each other and cure.

8 Claims, No Drawings

RESIN COMPOSITION AND METHOD OF MANUFACTURING THE SAME

BACKGROUND OF THE INVENTION

1. Field of the Invention

This invention relates to a thermosetting resin composition providing rapid curing and being distinguished in low shrinkage when used according to the resin transfer molding method (which will be referred to as RTM or R-RIM hereafter) which is one of the molding methods for fiber reinforced thermosetting plastics (which will be referred to as FRP hereafter).

2. Description of Related Art

RTM is characteristic in that it permits low pressure, low temperature molding so that the equipment investment such as mold and press costs can be reduced. However, the method has various problems in that its finished product output (productivity) and the mechanical characteristics of the manufactured material (moldability) are poor as compared with those of other conventional methods and also that it provides molded articles whose surface has poor smoothness and therefore it is unsuitable for producing outside plate or shell plate moldings which require mirror surface-like, beautiful appearance.

In order to remedy these shortcomings, there is a need for a resin composition having improved curing performance and more rapid curing at low and moderate temperatures as well as low shrinkage.

Generally, thermosetting resins containing a vinyl monomer as a crosslinking agent have a high volume reduction ratio upon curing, e.g., as high as 5 to 12%. This not only causes decrease in strength, occurrence of cracks, bend or warp, and the like but also deteriorates the surface smoothness of molded articles due to raising of glass fiber contained in the reinforced resin composition used as a starting material on the surface of the molded articles.

In order to overcome the above-described problems, there has been generally used a method in which a thermosetting resin is blended with a thermoplastic resin such as polystyrene or polyvinyl acetate. In order for the thermoplastic resin to effectively act as a low shrinkage agent, the molding temperature upon molding by curing must be high enough. In fact, there has been obtained no sufficient shrinkage lowering effect by methods other than heat-molding at temperatures not lower than 100° C.

That is, the R-RIM methods which involve molding at low or moderate temperatures of lower than 100° C. exhibit only insufficient shrinkage lowering effect. Conventional approaches for the problems have been concentrated on the improvement of the low shrinkage agent. For example, in the method disclosed in Japanese Patent Publication (Kokai) No. 60-141753, excellent shrinkage lowering effect is obtained at 20° C. However, this improvement is achieved at the sacrifice of curing time, i.e., 6 to 8 hours are necessary to cure the resin. Therefore, rapid curing and low shrinkage have not been achieved at the same time by conventional approach.

SUMMARY OF THE INVENTION

As the results of intensive research with a view to obtaining a thermosetting resin composition which will satisfy both the requirements of rapid curing and low shrinkage simultaneously at low and moderate temperatures, the present inventors have developed a thermosetting resin composition distinguished in having rapid curing characteristics and low shrinkage during molding by dissolving, in a monomer mixture composed of styrene and methyl (meth)acrylate, a mixture of (a) an unsaturated polyester, (b) a polymer having a (meth)acrylate group only at one or both terminals of its main chain and (c) a poly(meth)acrylate oligomer having an isocyanurate ring in its basic skeleton, and mixing the resulting mixture with a low shrinkage agent.

Accordingly, the present invention provides a thermosetting resin composition comprising
(a) an unsaturated polyester,
(b) a polymer having a (meth)acrylate group only at one or both terminals of its main chain,
(c) a poly(meth)acrylate oligomer,
(d) a styrene monomer, and
(e) a methyl methacrylate monomer.

In another aspect, the present invention provides a method of molding a thermosetting resin composition comprising
(a) an unsaturated polyester,
(b) a polymer having a (meth)acrylate group only at one or both terminals of its main chain,
(c) a poly(meth)acrylate oligomer,
(d) a styrene monomer, and
(e) a methyl methacrylate monomer,
wherein said method comprises dividing said thermosetting resin composition into two parts, adding a curing agent to one of said two parts and a curing accelerator to another to form two partial compositions, introducing said two partial compositions into a mold, and allowing said two partial compositions to mix with each other and cure.

DETAILED DESCRIPTION OF THE INVENTION

The unsaturated polyester (a) which can be used in the present invention refers to an unsaturated polyester which contains 20 to 70% by weight of an unsaturated dibasic acid and is obtainable through reaction between an acid component containing a saturated polybasic acid, if desired, and a polyhydric alcohol component in an equivalent proportion of 1:1. If the unsaturated dibasic acid is less than 20% by weight, the curing performance degrades, and if it is greater than 70% by weight, the resistance to cracking deteriorates.

Examples of such an unsaturated dibasic acid component constituting the unsaturated polyester (a) include well known and widely used α,β-unsaturated dibasic acids such as maleic acid, fumaric acid, itaconic acid, citraconic acid, metaconic acid and chlorinated maleic acid or anhydrides thereof. Among these unsaturated dibasic acids, maleic anhydride is preferred.

Examples of the saturated polybasic acid component which can be used concurrently in the present invention together with the unsaturated dibasic acids, if desired, include widely known and conventionally employed saturated acids, or anhydrides or esters thereof such as phthalic acid, phthalic anhydride, tetrahydrophthalic anhydride, cis-3-methyl-4-cyclohexene-cis-1,2-dicarboxylic anhydride, isophthalic acid, terephthalic acid, dimethylterephthalic acid, monochlorophthalic acid, dichlorophthalic acid, trichlorophthalic acid, chlorendic acid (Het acid), tetrabromophthalic acid, sebacic acid, succinic acid, adipic acid, glutaric acid, pimelic acid, trimellitic acid and pyromellitic acid.

Examples of the alcohol component of the unsaturated polyester (a) include widely known and conventionally employed polyhydric alcohols such as, for example, ethylene glycol, diethylene glycol, triethylene glycol, polyethylene glycol, propylene glycol, dipropylene glycol, tripropylene glycol, polypropylene glycol, 1,3-butylene glycol, 2,3-butylene glycol, 1,4-butylene glycol, neopentyl glycol, hexylene glycol, octyl glycol, trimethylolpropane, glycerine, pentaerythritol, ethylene oxide or the propylene oxide addition product of hydroquinone, ethylene oxide, or the propylene oxide adduct of bisphenol A, hydrogenated bisphenol A and tricyclodecane dimethylol. Of these, propylene glycol is particularly preferred.

The polymer (b) having a (meth)acrylate group only at one or both terminals in its main chain which can be used in the present invention is a polymer, which is preferably in the form of a straight chain and has hydroxyl groups as side chains, the polymer having (meth)acrylic acid, hydroxy(meth)acrylate or glycidyl (meth)acrylate introduced into the molecular chain as a terminal group of the main chain and containing 10% by weight or more, preferably, 20 to 40% by weight, based on the molecular weight of the polymer, of (meth)acryloyl group of the formula:

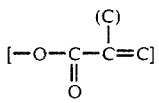

The polymer (b) used in the present invention specifically refers to epoxy acrylates, polyester acrylates and urethane acrylates, preferably polyester acrylates and epoxy acrylates.

Such epoxy acrylate is an epoxy acrylate obtainable by reaction of a polyepoxide (epoxy resin) with an α,β-unsaturated monobasic acid in an equivalent proportion of 1:2. That is, it refers to an epoxy acrylate having a main chain of polyepoxide and both terminals of a (meth)acrylate group.

Representative examples of the polyepoxide (epoxy resin) include condensation products of polyphenols and (methyl)-epichlorohydrin. For the polyphenols, bisphenol A, 2,2,-bis(4-hydroxyphenyl)methane (bisphenol F), halogenated bisphenol A, resorcinol, tetrahydroxyphenylethane, phenol novolak, cresol novolak, bisphenol A novolak and bisphenol F novolak may be employed. Also usable are epoxy compounds of the alcohol ether type obtainable from polyols such as ethylene glycol, butane diol, glycerine, polyethylene glycol, polypropylene glycol and alkylene oxide-adduct of bisphenols, and (methyl)epi-chlorohydrin; glycidyl amines obtainable from anilines such as diaminodiphenylmethane, diaminophenylsulfone and p-aminophenol, and (methyl)epichlorohydrin; glycidyl esters based on acid anhydrides such as phthalic anhydride and tetrahydro- or hexahydrophthalic anhydride, and alicyclic epoxides such as 3,4-epoxy-6-methylcyclohexylmethyl and 3,4-epoxy-6-methylcyclohexyl carbonate. Compounds having a bisphenolic skeleton are preferred.

For the α,β-unsaturated monobasic acids, acrylic acid and methacrylic acid are representative.

The unsaturated polyester acrylate having (meth)acrylate groups at its terminals which can be used in the present invention refers to an unsaturated polyester acrylate having an unsaturated glycidyl compound added to an unsaturated polyester obtainable through reaction of an acid component containing a saturated polybasic acid or its anhydride, and if desired, an unsaturated polybasic acid or its anhydride with an alcohol component in an equivalent proportion of 2:1. Also usable is an unsaturated polyester acrylate having an unsaturated glycidyl compound added to an unsaturated polyester containing a carboxyl group at each terminal.

Examples of the unsaturated glycidyl compound constituting a component of the polyester include those that are generally known and conventionally used such as glycidyl esters of unsaturated monobasic acids of acrylic acid and methacrylic acid such as, for example, glycidyl acrylate and glycidyl methacrylate. For the unsaturated glycidyl compound, glycidyl methacrylate is preferred.

Examples of the dibasic acid component include any generally known and conventionally used saturated acids or their anhydrides or esters such as, for example, phthalic acid, phthalic anhydride, tetrahydrophthalic anhydride, cis-3-methyl-4-cyclohexene-cis-1,2-dicarboxylic anhydride, isophthalic acid, terephthalic acid, dimethylterephthalic acid, monochlorophthalic acid, dichlorophthalic acid, trichlorophthalic acid, chlorendic acid (Het acid), tetrabromophthalic acid, sebacic acid, succinic acid, adipic acid, glutaric acid, pimelic acid, trimellitic acid and pyromellitic acid. Isophthalic acid is preferred.

As the unsaturated polybasic acid or anhydride thereof to be used jointly, generally known and conventionally used α,β-unsaturated polybasic acids such as maleic acid, fumaric acid, itaconic acid, citraconic, metaconic acid and chlorinated maleic acid, or anhydrides thereof may be employed as desired.

Examples of the alcohol component of the polyester acrylate include polyhydric alcohols which are generally known and conventionally used such as ethylene glycol, diethylene glycol, triethylene glycol, polyethylene glycol, propylene glycol, dipropylene glycol, tripropylene glycol, polypropylene glycol, 1,3-butylene glycol, 2,3-butylene glycol, 1,4-butylene glycol, neopentyl glycol, hexylene glycol, octyl glycol, trimethylolpropane, glycerine, pentaerythritol, ethylene oxide or propylene oxide adduct of hydroquinone, hydrogenated bisphenol A and tricyclodecane dimethylol. Glycols of rigid structure having a bisphenol skeleton are particularly preferred.

The number average molecular weight for the polymer (b) used in the present invention is preferably 900 to 3,000, and more preferably 1,000 to 2,800. If the number average molecular weight is less than 900, the molded product tends to have deteriorated crack resistance although its curing property is somewhat improved. If the number average molecular weight is greater than 3,000, the molding process requires a great deal of time because of degradation of the rapid curing performance which thus results in a decrease in productivity.

The poly(meth)acrylate oligomer (c) used in the present invention is a polyester poly(meth)acrylate having at least one isocyanurate ring in its molecule and represented by the formula

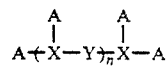

wherein A represents (meth)acrylic acid, Y represents a polybasic acid, X represents a polyhydric alcohol residue comprising a tris(hydroxyalkyl) isocyanurate group as essential component, and n is an integer of 0 to 3.

The oligomer (c) can be obtained by esterification reaction between a polyhydric alcohol comprising a tris(hydroxyalkyl) isocyanurate as essential component and (meth)acrylic acid. Suitable example of the tris(hydroxyalkyl) isocyanurate include tris(2-hydroxyethyl) isocyanurate, tris(2-hydroxypropyl) isocyanurate, tris(-hydroxycyclohexyl) isocyanurate, etc. as described in Japanese Patent Publication (Kokai) No. 62-20522.

According to the present invention, the weight based mixing proportion of the unsaturated polyester (a) and the polymer (b) having a (meth)acrylate group at one or both terminals in its main chain is (a):(b) =90:10 to 20:80, and preferably 80:20 to 30:70. When the unsaturated polyester is more than 90 parts by weight, cracks tend to occur and complete curing is difficult, and when it is less than 20 parts by weight, the shrinkage lowering effect is not obtained sufficiently.

The weight based mixing proportion of the poly(meth)acrylate oligomer (c) to sum of the unsaturated polyester (a) and the polymer (b) having a (meth)acrylate group only at one or both terminals in its main chain is $(c):(a)+(b)=2:98$ to 40:60, and preferably 5:95 to 50:50. When the amount of the poly(meth)acrylate oligomer is less than 5 parts by weight, the heat resistance of the resulting resin composition is insufficient as well as the reaction temperature due to generation of heat upon curing decreases, with the result that no shrinkage lowering effect can be obtained. On the other hand, When its is more than 50 parts by weight, the crosslink density of the resin becomes undesirably high, which not only causes cracks but also is economically disadvantageous.

In the present invention, the components (a), (b) and (c) may be replaced by a molecule in which the unsaturated polyester residue, (meth)acrylate residue and poly(meth)acrylate oligomer residue in the components (a), (b) and (c), respectively, are contained in the same molecule as attached thereto via chemical bonds.

The styrene monomer (d) and methyl methacrylate monomer (e) used in the present invention are important for efficiently crosslinking the components (a), (b) and (c) comprised by the thermosetting resin composition to obtain a resin composition having rapid curing and shrinkage lowering properties. For example, use of styrene monomer alone fails to give rapid curing property. On the other hand, shrinkage lowering property is not obtained by using methyl methacrylate alone although rapid curing property is enough. More particularly, the styrene monomer (d) reacts with the unsaturated polyester (a) to generate heat and raises the temperature of the reaction mixture, which contributes to improve shrinkage lowering effect. The methyl methacrylate monomer (e) is particularly important since it reacts with the polymer (b) which has a (meth)acrylate group only at one or both terminals in its main chain to exhibit rapid curing property. However, a small amount of one or more other vinyl monomers may be added to the components (d) or (e) so far as they will not deteriorate the effects of the present invention. The poly(meth)acrylate oligomer, component (c), is particularly important for improving the heat resistance of the resulting resin composition which would otherwise decrease when a thermoplastic polymer is used as a low shrinkage agent.

The styrene monomer, component (d) is used in an amount of 30 to 150 parts by weight, preferably 40 to 140 parts by weight, per 100 parts by weight of the unsaturated polyester, component (a). When the styrene monomer is contained in an amount of less than 30 parts by weight, the viscosity of the composition increases to deteriorate the efficiency of working, or the elevation of temperature due to heat generation upon curing is low, resulting in insufficient shrinkage lowering effect. On the other hand, the crosslink density decreases to thereby deteriorate heat resistance and mechanical strength of the resulting resin composition when the amount of the styrene monomer is more than 150 parts by weight.

The weight based mixing proportion of the methyl methacrylate monomer, component (e), is 30 to 150 parts by weight, and preferably 40 to 140 parts by weight, per 100 parts by weight of sum of the polymer which has a (meth)acrylate group only at one or both terminals in its main chain components, component (b), and the poly(meth)acrylate oligomer, component (c). The viscosity of the resin composition increases to deteriorate the efficiency of working or rapid curing property of the resin composition when the amount of the methyl methacrylate monomer is less than 30 parts by weight. On the other hand, when the resin composition contains more than 150 parts by weight of the methyl methacrylate monomer, the crosslink density of the resin decreases and problems occur that the heat resistance and mechanical strength of molded articles made therefrom decrease as well as the surface of the molded articles becomes sticky.

The thermoplastic resin composition of the present invention may contain a thermoplastic organic polymer in an amount of 5 to 40 parts by weight, and preferably 10 to 30 parts by weight, per 100 parts by weight of sum of the components (a), (b) and (c). When the amount of the thermoplastic resin is less than 5 parts by weight, there is obtained insufficient shrinkage lowering effect, and on the other hand rapid curing property is not obtained when it is contained in an amount more than 40 parts by weight.

For the low shrinkage agent, three can be cited, for example, such thermoplastic resins as homopolymers or copolymers of lower alkyl esters of acrylic or methacrylic acid such as methyl methacrylate, ethyl methacrylate, butyl methacrylate, methyl acrylate and ethyl acrylate, and monomers of styrene, vinyl chloride and vinyl acetate, copolymers of at least one of said vinyl monomers and at least one of monomers comprising lauryl methacrylate, isovinyl methacrylate, acrylamide, methacrylamide, hydroxyalkyl acrylate or methacrylate, acrylonitrile, methacrylonitrile, acrylic acid, methacrylic acid and cetylstearyl methacrylate; and further cellulose acetate butyrate and cellulose acetate propionate, polyethylene, polypropylene and saturated polyesters and the like. These may be added, if desired, for particular use, so long as the effect of the invention is not impaired.

The resin composition of the present invention may contain one or more of various additives such as a thickener, coloring agent, reinforcing agent, filler, curing catalyst, curing accelerator, curing retarder, internal lubricant and the like, if desired.

If a thickener is used, it should be such that it chemically bonds with the hydroxyl and carboxyl groups and ester bonds contained in the resin to form linear or partially cross-linked bonds and thus increase the molecular weight and the viscosity of the unsaturated polyester resin. Examples of such thickeners, include diisocyanates such as toluene diisocyanate, metal alkoxides such as aluminum isopropoxide and titanium tetrabutoxide, oxides of divalent metals such as magnesium oxide, calcium oxide and beryllium oxide, and hydroxides of divalent metals such as calcium hydroxide. The amount of the thickener is normally 0.2 to 10 parts by weight, and preferably 0.5 to 4 parts by weight per 100 parts by weight of the resin composition including the components (a), (b) and (c). Also, a small amount of a highly polar substance such as water may be used as an auxiliary thickener, if desired.

As for the coloring agent, there can be used any of the conventional organic and inorganic dyes and pigments. However, coloring agents having significant heat resistance and transparency, and which do not impede curing of the unsaturated polyester and terminal (meth)acrylate group containing oligomer are preferred.

For the reinforcing agent used in the present invention, fiberglass is often employed. However, organic fibers of vinylon, polyester, phenol, poly(vinyl acetate), polyamide and poly(phenylene sulfide) and inorganic fibers of asbestos, carbon fiber, metal fiber and ceramic fiber, may be used as well. These may be in the forms of stranded, knitted and nonwoven fabric, planar or solid. The reinforcing agent is not limited to such fibers, and plastic foams such as polyurethane foam, phenol foam, vinyl chloride foam and polyethylene foam, hollow hardened products of glass and ceramics, and solid, molded products or honeycomb structures of metals, ceramics, plastics, concrete, wood and paper can also be used.

Examples of the filler include calcium carbonate powder, clay, alumina powder, silica, talc, barium sulfate, silica powder, glass powder, glass beads, mica, aluminum hydroxide, cellulose filament, quartz sand, river sand, white marble, marble scraps and crushed stone. Of these, glass powder, aluminum hydroxide and barium sulfate are particularly preferred in that they provide semi-transparency in curing.

To accelerate the curing, a metal compound may be added to the resin composition if desired. For such a metal compound, metal compound accelerators which are generally used for unsaturated polyester resins are employed. Examples include cobalt naphthonate, cobalt octonate, divalent acetylacetone cobalt, trivalent acetylacetone cobalt, potassium hexoate, zirconium naphthonate, zirconium acetylacetonate, vanadium naphthonate, vanadium octonate, vanadium acetylacetonate and lithium acetylacetonate, and combinations thereof. Also, such accelerator may be used in combination with any other conventional accelerators such as amines, phosphorus containing compounds, and $\beta$-diketones.

The amount of addition of such curing accelerators is subject to adjustment with the gelling time, but it is preferably 0.0001 to 0.12 parts by weight of the metal component per 100 parts by weight of the resin composition. In the case of molding at a medium temperature or higher (40° C. or higher), the use of curing accelerators is optional.

Examples of the curing catalyst include such compounds which act on the unsaturated polyester (a), terminal (meth)acrylate group in the main chain of the polymer (b), or poly(meth)acrylate oligomer (c), including azo compounds such as azoisobutyro-nitrile and organic peroxides such as tertiary butyl perbenzoate, tertiary butyl peroctoate, benzoyl peroxide, methyl ethyl ketone peroxide, acetoacetic ester peroxide and dicumyl peroxide. The catalyst is used in an amount of 0.1 to 4 parts by weight, or preferably 0.3 to 3 parts by weight, per 100 parts by weight of the resin composition including including the components (a), (b) and (c).

Redox curing agents such as acetoacetic ester peroxide/cobalt naphthenate and benzoyl peroxide/dimethyl p-toluidine are particularly preferred.

For the curing retarder, hydroquinone, toluhydroquinone, tertiary-butylcatechol and copper naphthenate, may be used, preferably in an amount or 0.0001 to 0.1 part by weight per 100 parts by weight of the resin composition.

For the internal lubricant, conventional higher fatty acids and higher fatty acid esters such as stearic acid and zinc stearate and alkyl phosphoric esters may be used. Such lubricants can be used in a proportion of normally 0.5 to 5 parts by weight per 100 parts of the resin composition.

The resin composition according to the present invention is of a viscosity of preferably 3 poises or less at 25° C. But, it is not always required that the viscosity be 3 poises or less at at all times. So long as the effect of the invention is achieved, a resin with a higher viscosity can be used as long as the viscosity is reduced to 3 poises or less by heating or otherwise at the time of injection into the mold. Such a viscosity allows injection into the R-RIM molding machine with ease. If the viscosity is greater than 3 poises, much time is required for injection, and so the productivity is decreased.

According to the present invention, the molded product is produced by dividing the resin composition into two parts, adding a curing agent (peroxide) to one part (component A) and an accelerator to the other (component A'), circulating these two components A and A' in separate lines respectively under high pressure (injection pressure) of preferably 5 to 200 kg/cm$^2$ or more preferably 80 to 150 kg/cm$^2$, and injecting them in a short time of preferably 0.1 to 30 seconds or more preferably 0.5 to 20 seconds into a mold having a reinforcing agent charged and maintained at a mold temperature of preferably 10° to 80° C. or more preferably 40° to 70° C. and a mold pressure of preferably 5 to 100 kg/cm$^2$ or more preferably 20 to 50 kg/cm$^2$.

According to the invention, molding is performed at a molding temperature of 80° C. or less (mold temperature). If molded at a temperature higher than 80° C., the methyl (meth)acrylate monomer is subject to evaporation to produce air bubbles in, or voids on the surface of, the molded product, resulting in cracking. Accordingly, such temperatures are not desirable.

Also, according to the invention, the molded product has a reinforcing agent charged before it is locked prior to injection. Here, according to the prior art in which the reinforcing agent was added to the composition before injection, it was difficult to provide a high strength as the reinforcing agent was of a fibrous form. Also, according to the conventional RTM, when a reinforcing agent in the form of long filaments is used, if the injection time is reduced, the reinforcing agent is caused to redistribute on account of the high viscosity of the resin composition so that the mechanical strength is not evenly distributed, resulting in a product of poor quality. According to the present invention, such problems are eliminated, and a uniform molded product having a high mechanical strength can be obtained.

The resin composition of the present invention may be cured with heat with various peroxides added or by ultraviolet light or any other active light with various photosensitizers added. In such a case, the properties of rapid curing and remarkable mechanical strength are maintained.

The resin composition of the present invention is distinguished in rapid curing characteristics and low shrinkage at low and moderate temperatures and thus is excellent as a resin composition for RTM method for producing FRP exterior trims for automobiles for which smoothness of surface is required.

EXAMPLES

Now, the present invention be described in detail with reference to examples and reference examples. It should be noted that "parts" in the following indicates parts by weight.

REFERENCE EXAMPLE 1

Preparation of unsaturated polyester [PE-1]

Heating, dehydrating and condensing 540 g of maleic anhydride and 460 g of 1-2 propylene glycol in an inert gas at 220° C. for 10 hours, there was obtained a condensation product giving an acid value of 30. To this, 0.15 g of hydroquinone was added, and the mixture was cooled to 120° C. Then, this solid was dissolved in 600 g of styrene monomer, and there was obtained an unsaturated polyester of a solid content of 60.2%, viscosity of 3.8 poises (at 25° C.) and acid value of 18.6 with the content of unsaturated dibasic acid being 59.9% by weight.

REFERENCE EXAMPLE 2

Preparation of unsaturated polyester [PE-2]

Heating, dehydrating and condensing 237 g of maleic anhydride, 358 g of phthalic anhydride and 405 g of 1,2-propylene glycol in an inert gas at 220° C. for 10 hours, there was obtained a condensation product giving an acid value of 28. To this, 0.15 g of hydroquinone was added, and the mixture was cooled to 120° C. Then, this solid was dissolved in 390 g of styrene monomer, and there was obtained an unsaturated polyester of a solid content of 70.1%, viscosity of 4.0 poises (at 25° C.) and acid value of 17 with the content of unsaturated dibasic acid being 26% by weight.

REFERENCE EXAMPLE 3

Preparation of unsaturated polyester [PE-3]

Heating, dehydrating and condensing 152 g of maleic anhydride, 459 g of phthalic anhydride and 389 g of 1,2-propylene glycol in an inert gas at 220° C. for 10 hours, there was obtained a condensation product giving an acid value of 25. To this, 0.15 g of hydroquinone was added, and the mixture was cooled to 120° C. Then, this solid was dissolved in 600 g of methyl methacrylate monomer, and there was obtained an unsaturated polyester of a solid content of 60%, viscosity of 6.2 poises (at 25° C.) and acid value of 15 with the content of unsaturated dibasic acid being 16.6% by weight.

REFERENCE EXAMPLE 4

Preparation of unsaturated polyester [PE 4]

Heating, dehydrating and condensing 540 g of maleic anhydride and 460 g of 1,2-propylene glycol in an inert gas at 220° C. for 10 hours, there was obtained a condensation product giving an acid value of 29. To this, 0.15 g of hydroquinone was added, and the mixture was cooled to 120° C. Then, this solid was dissolved in 600 g of methyl methacrylate monomer, and there was obtained an unsaturated polyester having a resin solid content of 59.8%, viscosity of 6.2 poises (at 25° C.) and acid value of 16.5 with the content of unsaturated dibasic acid being 59.9% by weight.

REFERENCE EXAMPLE 5

Preparation of epoxy acrylate [AC-1]

In a three-necked flask provided with a thermometer, stirrer and cooler, 1,850 g of "EPICLON R 850" (epoxy resin product of Dainippon Ink & Chemicals, Inc.) obtained through reaction of bisphenol A with epichlorohydrin with an epoxy equivalent of 185 (equivalent to 10 epoxy groups), 860 g of methacrylic acid (equivalent to 10 carboxyl groups), 1.36 g of hydroquinone and 10.8 g of triethylamine were introduced, and the mixture was heated to 120° C. and allowed to react at the same temperature for 10 hours, after which there was obtained liquid epoxy acrylate with an acid value of 3.5, epoxy equivalent of 15,000 or more and color number of 2. Then, dissolving this epoxy acrylate in 2,217 g of methyl methacrylate monomer, there was obtained 4,920 g of epoxy acrylate of the non-volatile component at 55%, acid value at 2, viscosity at 2 poises at at 25° C. and (meth)acrylate group content in the solid at 31.4% by weight.

REFERENCE EXAMPLE 6

Heating, dehydrating and condensing 166 g (1 mol) of isophthalic acid and 152 g (2 mols) of 1,2-propylene glycol in an inert gas at 220° C. for 10 hours, there was obtained a reaction product having a solid component with an acid value of 5. Then, it was cooled to 100° C. Next, 196 g (2 mols) of maleic anhydride was charged, and through heating, dehydration and condensation at 200° C. for 5 hours, there was obtained a reaction product having a solid content of an acid value of 254. To this, 0.15 g of hydroquinone was added, and the mixture was cooled to 140° C. Next, 284 g (2 mols) of glycidyl methacrylate was charged and through reaction at 140° C. for 10 hours, there was obtained a solid reaction product with an acid value of 10. Dissolving this unsaturated polyester acrylate in 508 g of methyl methacrylate monomer, there was obtained 1,270 g of an unsaturated polyester acrylate with a solid content of 60.5%, viscosity of 0.5 poises at 25° C., acid value of 6.1 and the acrylate group content in the solid at 23.4% by weight.

REFERENCE EXAMPLE 7

Preparation of styrene type epoxy acrylate [AC-3]

In a three-necked flask provided with a thermometer, stirrer and cooler 1,850 g of "EPICLON R 850" (epoxy resin product of Dainippon Ink & Chemicals, Inc.) obtained through reaction of bisphenol A with epichlorohydrin with an epoxy equivalent of 185 (equivalent to 10 epoxy groups), 860 g of methacrylic acid (equivalent to 10 carboxyl groups), 1.36 g of hydroquinone and 10.8 g of triethylamine were introduced, and the mixture was heated to 120° C. and allowed to react at the same temperature for 10 hours, after which there was obtained liquid epoxy acrylate with an acid value of 3.5, epoxy equivalent of 15,000 or more and color number of 2. Then, dissolving this epoxy acrylate in 1,800 g of styrene monomer, there was obtained 4,500 g of styrene type epoxy acrylate of a solid content of 60.3%, acid value of 2.1, viscosity of 10 poises at 25° C. and (meth)acrylate group content in the solid of 31.4% by weight.

REFERENCE EXAMPLE 8

Preparation of unsaturated polyester acrylate [AC-4]

Heating, dehydrating and condensing 133 g (0.8 mol) of isophthalic acid and 76 g (1 mols) of 1,2-propylene glycol, and 324 g (1 mol) of ethylene oxide 2 mol adduct of bisphenol A in an inert gas at 220° C. for 9 hours, there was obtained a reaction product having a solid component with an acid value of 3. Then, it was cooled to 100° C. Next, 147 g (1.5 mols) of maleic anhydride was charged, and through heating, dehydration and condensation at 200° C. for 6 hours, there was obtained a reaction product having a solid component of an acid value of 37. To this, 0.16 g of hydroquinone was added, and the mixture was cooled to 140° C. Next, 85 g (0.6 mols) of glycidyl methacrylate was charged and through reaction at 140° C. for 6 hours, there was obtained a solid reaction product with an acid value of 10. Dissolving this unsaturated polyester acrylate in 456 g of methyl methacrylate monomer, there was obtained 1,088 g of an unsaturated polyester acrylate with a solid content of 60.2%, viscosity of 20 poise of 25° C., acid value of 6 and the acrylate group content in the solid of 7.2% by weight.

REFERENCE EXAMPLE 9

Preparation of epoxy acrylate [AC-5]

In a three-necked flask provided with a thermometer, stirrer and cooler 1,300 g of "EPICLON ® 725" (epoxy resin product of Dainippon Ink & Chemicals, Inc.) obtained through reaction of bisphenol A with epichlorohydrin with an epoxy equivalent of 130 (equivalent to 10 epoxy groups), 860 g of methacrylic acid (equivalent to 10 carboxyl groups), 1.36 g of hydroquinone and 10.8 g of triethylamine were introduced, and the mixture was heated to 110° C. and allowed to react at the same temperature for 8 hours, after which there was obtained 2,160 g of a liquid epoxy acrylate with an acid value of 5. Then, dissolving this liquid epoxy acrylate in 1,440 g of methyl methacrylate monomer, there was obtained 3,550 g of epoxy acrylate of a solid content of 6.2%, acid value of 3, viscosity of 0.5 poises at 25° C. and (meth)acrylate group content in the solid of 39.3% by weight.

Characteristics of the resin compositions obtained in Reference Examples 1 through 9 are shown in Table 1.

TABLE 1

| Resin | Charge Compositions (A–K) | | | | | | | | | | | Characteristics (L–Q) | | | | | |
|---|---|---|---|---|---|---|---|---|---|---|---|---|---|---|---|---|---|
| | A | B | C | D | E | F | G | H | I | J | K | L | M | N | O | P | Q |
| Unsaturated polyester | | | | | | | | | | | | | | | | | |
| Reference Example 1 PE-1 | 460 | | | | 540 | | | | 901 | | 600 | 60.2 | 18.6 | 6.2 | 59.9 | | |
| Reference Example 2 PE-2 | 405 | | 358 | 237 | | | | | 913 | | 390 | 70.1 | 17 | 6.8 | 26 | | |
| Reference Example 3 PE-3 | 389 | | 459 | 152 | | | | | 916 | | 600 | 60 | 15 | 5.5 | 6.6 | | |
| Reference Example 4 PE-4 | 460 | | | | 540 | | | | 900 | 600 | | 59.8 | 16.5 | 3.2 | 59.9 | | |
| Polymer having a (meth)acrylate group only at terminals in the main chain | | | | | | | | | | | | | | | | | |
| Reference Example 5 AC-1 | | | | | | | 1850 | 860 | 2710 | 2217 | | 55 | 2 | 2 | | 31.4 | 1487 |
| Reference Example 6 AC-2 | 152 | | 166 | 196 | 284 | | | | 762 | 498 | | 60.5 | 6.1 | 0.5 | | 23.4 | 1400 |
| Reference Example 7 AC-3 | | | | | | | 1850 | 860 | 2710 | | 1800 | 60.3 | 2.1 | 10 | | 31.4 | 1487 |
| Reference Example 8 AC-4 | 76 | 324 | 133 | 147 | 85 | | | | 632 | 456 | | 60.2 | 6 | 20 | | 7.2 | 3660 |
| Reference Example 9 | | | | | | | 1300 | 860 | 2160 | 1440 | | 61.2 | 3 | 0.5 | | 39.3 | 807 |

TABLE 1-continued

| Resin | Charge Compositions (A-K) | | | | | | | | | | | Characteristics (L-Q) | | | | | |
|---|---|---|---|---|---|---|---|---|---|---|---|---|---|---|---|---|---|
| | A | B | C | D | E | F | G | H | I | J | K | L | M | N | O | P | Q |
| AC-5 | | | | | | | | | | | | | | | | | |

Notes:
A - 1,2-Propylene glycol
B - Ethylene oxide (2 mol) adduct of bisphenol A
C - Isophthalic acid
D - Orthophthalic anhydride
E - Maleic anhydride
F - Glycidyl methacrylate
G - EPICLON ® 850 EPICLON ® 725
H - Methacrylic acid
I - Total solid content of resin
J - Methyl methacrylate monomer
K - Styrene monomer
L - Solid content of resin (%)
M - Acid value (mg KOH/g)
N - Viscosity (poise at 25° C.)
O - Unsaturated dibasic acid content (%)
P - Methacryloyl content (%)
Q - Number average molecular weight

EXAMPLES 1 to 4 AND COMPARATIVE EXAMPLES 1 TO 8

As Example 1, the resin PE-1 obtained in Reference Example 1 and the resin AC-1 obtained in Reference Example 5, poly(meth)acrylate oligomer (ARONIX M-9050, product of Toa Synthetic Chemical Industry Co., Ltd.), a low shrinkage agent, 50% benzoyl peroxide, and dimethyl paratoluidine were compounded in the proportions shown in Table 2. The results are also shown in Table 2. Examples 2 to 4 and comparative Examples 1 to 8 were carried out similarly to Example 1. Measurement of the characteristics was made according to the methods shown below.

Appearance: Visual observation

Curing performance: Obtained from a torque-time curve at 50° C. using CURELASTOMETER III (product of Japan synthetic Rubber Company)

Viscosity: Stationary flow viscometer at 25° C. (REOMETER IR-200, product of Iwamoto Seisakusho Co., Ltd.)

RTM molding test: Charging a preforming mat adjusted to a glass content of 30% by weight into a 600×800 mm box type electro-formed nickel/copper mold with epoxy resin backing, the mold was locked at 20 kg/cm². Injection of the resin into the mold was made using an injector, Model IP-6000 of Applicator Co., at a pump pressure of 6 kg/cm², and the duration from the time of start of the injection to the time of the resin flowing out of the clearance on the opposite side was taken as the injection time and shown as such.

Injection time and molding test: Charging a preforming mat adjusted to a glass content of 50% to a 50×100×0.3 cm aluminum mold, the mold was locked under 20 kg/cm². Injection of the resin into the mold was made under an injection pressure of 150 kg/cm² with a four mixing head RIM injector, product of Krauss-Maffei, used, and the duration from the time of start of the injection to the time of the resin flowing out of the clearance on the opposite side was taken as the injection time and shown as such.

Forming and tackiness: By visual observation.
Physical properties: JIS Designation K-6911.

EXAMPLE 5

In the same manner as Example 1, 100 parts by weight of the resin composed of PE-1 +AC-1, obtained in Reference Example 1 and 5, respectively, was divided into two parts, each in 50 parts by weight. To one part of the resin, 6 parts by weight of 50% benzoyl peroxide was added, and to the other, 0.2 part by weight of dimethyl para-toluidine was added, and each resin solution was circulated to a four mixing head RIM injector under a pressure of 150 kg/cm² and was injected to an aluminum mold having charged thereto a preforming mat preadjusted to a glass content of 50% by weight, maintained at a mold temperature of 50° C. and locked under a pressure of 20 kg/cm2, and thus a mold product was obtained. Physical properties of the mold product thus obtained are shown in Table 2.

The number average molecular weight specified in the invention refers to that value of GPC (gel permeation chromatography) which is determined under the following conditions of measurement:

GPC: Product of Japan Analytical Industry, Model LC-08
Column: SHODEX A 804+A 803+A-802+A 801 (product of Showa Denko)
Solvent: THF (tetrahydrofuran)
Standard sample for calibration curve: Polystyrene (product of Toso)
Detector: Differential refractometer (product of Japan Analytical Industry)

As seen from Table 2, the resin compositions of the present invention were distinguished in the rapid curing performance, crack resistance, tensile strength, tensile modulus of elasticity and Barcol hardness.

TABLE 2

| | Resin Composition (A-E) | | | | | Curing Agent (F-G) | | Molding Conditions (H-K) | | | | Results (L-Q) | | | | | |
|---|---|---|---|---|---|---|---|---|---|---|---|---|---|---|---|---|---|
| | AA | BB | CC | DD | EE | FF | GG | HH | II | JJ | KK | LL | MM | NN | OO | PP | QQ |
| Example | | | | | | | | | | | | | | | | | |
| 1 | PE-1 50 | AC-1 50 | 30 | 70 | 100 | 3 | 0.1 | 13 | 120 | 60 | 5 | excel | −0.02 (swell) | good | 33.5 | 17.0 | 610 |
| 2 | PE-2 50 | AC-1 50 | 30 | 70 | 100 | 3 | 0.1 | 11.8 | 130 | 60 | 5 | excel | 0.05 | good | 30.2 | 15.8 | 570 |
| 3 | PE-1 70 | AC-2 30 | 30 | 70 | 100 | 3 | 0.1 | 10.2 | 125 | 60 | 5 | excel | 0.02 | good | 31.5 | 15.0 | 590 |

TABLE 2-continued

| | Resin Composition (A–E) | | | | | Curing Agent (F–G) | | Molding Conditions (H–K) | | | | Results (L–Q) | | | | | |
|---|---|---|---|---|---|---|---|---|---|---|---|---|---|---|---|---|---|
| | AA | BB | CC | DD | EE | FF | GG | HH | II | JJ | KK | LL | MM | NN | OO | PP | QQ |
| 4 | PE-1 30 | AC-2 70 | 30 | 70 | 100 | 3 | 0.1 | 9.5 | 100 | 60 | 5 | fair | 0.07 | good | 35.7 | 17.5 | 680 |
| 5 | PE-1 50 | AC-1 50 | 30 | 70 | 100 | 3 | 0.1 | 13 | 120 | 22 | 5 | excel | −0.02 (swell) | good | 33.5 | 16.2 | 587 |
| Comparative Example | | | | | | | | | | | | | | | | | |
| 1 | PE-1 100 | | 30 | 70 | 100 | 3 | 0.1 | 18 | 300 | 75 | 30 | excel | −0.05 (swell) | poor | 28.5 | 15.2 | 600 |
| 2 | | AC-1 100 | 30 | 70 | 100 | 3 | 0.1 | 10 | 80 | 60 | 5 | poor | 0.42 | good | 39.2 | 17.3 | 700 |
| 3 | PE-1 50 | AC-1 50 | 30 | 70 | 100 | 3 | 0.1 | 12.5 | 140 | 60 | 5 | poor | 0.28 | good | 23.7 | 14.2 | 490 |
| 4 | PE-4 50 | AC-1 50 | 30 | 70 | 100 | 3 | 0.1 | 14 | 150 | 60 | 10 | poor | 0.21 | poor | 29.0 | 15.5 | 585 |
| 5 | PE-3 50 | AC-1 50 | 30 | 70 | 100 | 3 | 0.1 | 12.5 | 200 | 60 | 20 | poor | 0.1 | poor | 29.4 | 14.5 | 512 |
| 6 | PE-1 50 | AC-3 50 | 30 | 70 | 100 | 3 | 0.1 | 13.8 | 270 | 60 | 30 | poor | 0.2 | poor | 33.2 | 17.2 | 630 |
| 7 | PE-1 50 | AC-4 50 | 30 | 70 | 100 | 3 | 0.1 | 2.5 | 170 | 120 | 15 | fair | 0.05 | poor | 30.1 | 16.0 | 550 |
| 8 | PE-1 50 | AC-5 50 | 30 | 70 | 100 | 3 | 0.1 | 7.5 | 100 | 60 | 5 | poor | 0.2 | good | 35.9 | 17.2 | 710 |

Notes.
AA - Unsaturated polyester resin (a)
BB - Polymer having a (meth)acrylate group only at one or both terminals in its main chain (b)
CC - Poly(meth)acrylate oligomer (c) (ARONIX M-9050, product by Toa Synthetic Chemical Industry Co., Ltd.)
DD - Low shrinkage agent, 30% solution of polyvinyl acetate (number average molecular weight: about 40,000) in a mixed solvent composed of styrene/methyl methacrylate = (a)/(b))
EE - Calcium carbonate (NS-100, product by Nitto Funka Co., Ltd.)
FF - 50% Benzoyl peroxide (part by weight)
GG - Dimethyl paratoluidine (part by weight per 100 parts by weight of the resin)
HH - Viscosity at 25° C. (poise)
II - Curing characteristics at 70° C. (second)
JJ - Injection time (second)
KK - Molding time (minute)
LL - Appearance (surface smoothness), by visual observation
MM - Shrinkage, according to JIS-K-6911
NN - Rapid curing property, determined based on whether or not 5 minute molding is possible
OO - Heat resistance (glass transition point (°C.)), according to JIS-K-7121, DSC method (Tg measurement)
PP - Flexural strength (kg/cm$^2$), according to JIS-K-6911
QQ - flexural modulus (kg/cm$^2$), according to JIS-K-6911
"excel" - excellent The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A thermosetting resin composition comprising
  (a) an unsaturated polyester derived from an unsaturated dibasic acid,
  (b) a polymer having a (meth)acrylate group only at one or both terminals of a main chain of said polymer,
  (c) a poly(meth)acrylate oligomer having at least one isocyanurate ring, of the formula

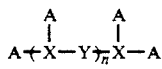

wherein A represents (meth)acrylic acid, Y represents a polybasic acid, X represents a polyhydric alcohol residue comprising a tris(hydroxyalkyl) isocyanurate as an essential component, and n is an integer of 0 to 3,
  (d) a styrene monomer, and
  (e) a methyl methacrylate monomer, wherein said components (a) and (b) are present in a weight proportion (a):(b) of 90:10 to 20:80, said components (a), (b) and (c) are present in a weight ratio (a)+(b):(c) of 98:2 to 2 to 60:40, said component (d) is present in an amount of 30 to 150 parts by weight per 100 parts by weight of said component (a), and said component (e) is present in an amount of 30 to 150 parts by weight per 100 parts by weight of sum of said components (b) and (c).

2. A thermosetting resin composition as claimed in claim 1, wherein said component (a) contains 20 to 70% by weight of an unsaturated dibasic acid.

3. A thermosetting resin composition as claimed in claim 1, wherein said component (b) contains at least 10% by weight of (meth)acrylate group and has a number average molecular weight of 900 to 3,000.

4. A thermosetting resin composition as claimed in claim 1, wherein said component (b) is selected from the group consisting of epoxy(meth)acrylate and polyester (meth)acrylate.

5. A thermosetting resin composition as claimed in claim 3, wherein said component (b) is selected from the group consisting of epoxy(meth)acrylate and polyester (meth)acrylate.

6. A thermosetting resin composition as claimed in claim 1, further comprising a thermoplastic resin.

7. A thermosetting resin composition as claimed in claim 6, wherein said thermoplastic resin is present in an amount of 5 to 40 parts by weight per 100 parts by weight of sum of said components (a), (b) and (c).

8. A method of molding a thermosetting resin composition comprising
  dividing said thermosetting resin composition into two parts, adding a curing agent to one of said two parts and a curing accelerator to another to form two partial compositions, introducing said two partial compositions into a mold, and allowing said two partial compositions to mix with each other and cure wherein said composition comprises
  (a) an unsaturated polyester derived from an unsaturated dibasic acid, (b) a polymer having a (meth)acrylate group only at one or both terminals of a main chain of said polymer, (c) a poly(meth)acrylate oligomer having at least one one isocyanurate ring, of the formula

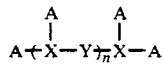

wherein A represents (meth)acrylic acid, Y represents a polybasic acid, X represents a polyhydric alcohol residue comprising a tris(hydroxyalkyl) isocyanurate as an essential component, and n is an integer of 0 to 3, (d) a styrene monomer, and (e) a methyl methacrylate monomer, wherein said components (a) and (b) are present in a weight proportion (a):(b) of 90:10 to 20:80, said components (a), (b) and (c) are present in a weight ratio (a)+(b):(c) of 98:2 to 60:40, said component (d) is present in an amount of 30 to 150 parts by weight per 100 parts by weight of said component (a), and said component (e) is present in an amount of 30 to 150 parts by weight per 100 parts by weight of sum of said components (b) and (c).

* * * * *

UNITED STATES PATENT AND TRADEMARK OFFICE
CERTIFICATE OF CORRECTION

PATENT NO. : 5,098,950

DATED : March 24, 1992

INVENTOR(S) : Kagaya et al

It is certified that error appears in the above-identified patent and that said Letters Patent is hereby corrected as shown below:

On title page, insert, item
-- [73] Assignee: Dainippon Ink and Chemicals, Inc., Tokyo Japan--.

Signed and Sealed this

Twenty-second Day of June, 1993

Attest:

MICHAEL K. KIRK

Attesting Officer

Acting Commissioner of Patents and Trademarks